United States Patent
Suzuki et al.

(10) Patent No.: US 11,656,196 B2
(45) Date of Patent: May 23, 2023

(54) SOLID ELECTROLYTE, MANUFACTURING METHOD THEREOF, AND GAS SENSOR

(71) Applicant: DENSO CORPORATION, Kariya (JP)

(72) Inventors: Satoshi Suzuki, Kariya (JP); Mitsuhiro Yoshida, Kariya (JP); Makoto Noguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 450 days.

(21) Appl. No.: 16/864,256

(22) Filed: May 1, 2020

(65) Prior Publication Data

US 2020/0256822 A1 Aug. 13, 2020

Related U.S. Application Data

(63) Continuation of application No. PCT/JP2018/038082, filed on Oct. 12, 2018.

(30) Foreign Application Priority Data

Nov. 3, 2017 (JP) .............................. JP2017-213346

(51) Int. Cl.
- *H01M 8/02* (2016.01)
- *G01N 27/407* (2006.01)
- *C04B 35/486* (2006.01)
- *C04B 35/626* (2006.01)
- *C04B 35/64* (2006.01)
- *H01B 1/08* (2006.01)

(52) U.S. Cl.
CPC ....... *G01N 27/4073* (2013.01); *C04B 35/486* (2013.01); *C04B 35/62695* (2013.01); *C04B 35/64* (2013.01); *H01B 1/08* (2013.01); *C04B 2235/3246* (2013.01); *C04B 2235/786* (2013.01)

(58) Field of Classification Search
CPC ....................................................... H01M 8/02
See application file for complete search history.

(56) References Cited

U.S. PATENT DOCUMENTS

| | | | |
|---|---|---|---|
| 4,370,393 A | 1/1983 | Watanabe et al. | |
| 2013/0316266 A1 | 11/2013 | Shimazu et al. | |

FOREIGN PATENT DOCUMENTS

| JP | S62-108766 | 5/1987 |
| JP | H09-124365 | 5/1997 |
| JP | 10-139436 | 5/1998 |
| JP | 2000-292406 | 10/2000 |
| JP | 2009-104990 | * 5/2009 |

* cited by examiner

*Primary Examiner* — Jacob B Marks
(74) *Attorney, Agent, or Firm* — Nixon & Vanderhye P.C.

(57) ABSTRACT

A solid electrolyte includes partially stabilized zirconia in which a stabilizer forms a solid solution in zirconia. The partially stabilized zirconia includes, as crystal particles that configure the partially stabilized zirconia, stabilizer low-concentration phase particles of which concentration of the stabilizer at a particle center is less than 4.7 mol % and stabilizer high-concentration phase particles of which the concentration of the stabilizer at the particle center is equal to or greater than 4.7 mol %. The partially stabilized zirconia includes an adjacent particle portion in which two or more particles of the stabilizer low-concentration phase particles of which an average particle size is greater than 0.1 μm are adjacent. An abundance ratio of the stabilizer high-concentration phase particles on a cross-section of the solid electrolyte is equal to or greater than 70% in terms of area ratio relative to all crystal particles.

15 Claims, 7 Drawing Sheets

FIG.10

SOLID ELECTROLYTE, MANUFACTURING METHOD THEREOF, AND GAS SENSOR

CROSS-REFERENCE TO RELATED APPLICATIONS

The present application is a continuation application of International Application No. PCT/JP2018/038082, filed Oct. 12, 2018, which claims priority to Japanese Patent Application No. 2017-213346, filed Nov. 3, 2017. The contents of these applications are incorporated herein by reference in their entirety.

BACKGROUND

Technical Field

The present disclosure relates to a solid electrolyte that is made of partially stabilized zirconia, a manufacturing method thereof, and a gas sensor that includes the solid electrolyte.

Background Art

A gas sensor element is used in an exhaust system of an internal combustion engine and the like for the purpose of detecting oxygen concentration, air-fuel ratio, and the like within exhaust gas. An oxide-ion-conducting solid electrolyte, such as zirconia, is used in such a gas sensor element.

SUMMARY

An aspect of the present disclosure provides a solid electrolyte that includes partially stabilized zirconia in which a stabilizer forms a solid solution in zirconia. The partially stabilized zirconia contains, as crystal particles that configure the partially stabilized zirconia, stabilizer low-concentration phase particles of which concentration of the stabilizer at a particle center is less than 4.7 mol % and stabilizer high-concentration phase particles of which the concentration of the stabilizer at the particle center is equal to or greater than 4.7 mol %. The partially stabilized zirconia includes an adjacent particle portion in which two or more particles of the stabilizer low-concentration phase particles of which an average particle size is greater than 0.1 m are adjacent. An abundance ratio of the stabilizer high-concentration phase particles on a cross-section of the solid electrolyte is equal to or greater than 70% in terms of area ratio relative to all crystal particles.

DESCRIPTION OF THE EMBODIMENTS

For example, JP-A-2000-202406 discloses a ceramic laminate that includes a solid electrolyte layer. The ceramic laminate such as this is used in gas sensors and the like. For example, the solid electrolyte layer is used in a state in which the solid electrolyte layer is in contact with a dissimilar material member that is made of alumina or the like. For example, the solid electrolyte layer is used in a state in which the solid electrolyte layer is in contact with a dissimilar material member of a ceramic heater that includes alumina. In addition, in a cup-type gas sensor that has a bottomed cylindrical solid electrolyte, the solid electrolyte is used in a state in which the solid electrolyte is in contact with a dissimilar material member of a protective layer that covers a surface of the solid electrolyte and is made of spinel or the like, or a state in which the solid electrolyte is covered by a protective layer via an electrode of about 1 μm. For example, the protective layer is formed by plasma spraying.

However, a difference in coefficient of thermal expansion may occur between the solid electrolyte that is made of the partially stabilized zirconia and the dissimilar material member. Therefore, damage that is attributed to the difference in coefficient of thermal expansion may occur between the solid electrolyte and the dissimilar material member in a cooling/heating cycle. For example, in a gas sensor, the difference in coefficient of thermal expansion leads to occurrence of peeling and cracking between the solid electrolyte and the ceramic heater, the protective layer, and the like.

In recent years, as vehicles are being required to follow strict fuel efficiency and emission regulations, for example, reliability in even higher temperature environments is being required of onboard gas sensors due to changes in mounting positions and the like. Meanwhile, frequent stop/start of engines as a result of popularization of hybrid cars, idle-stop cars, and the like has increased in frequency. In addition, heaters are frequently turned off during stopping from the perspective of reducing power consumption. Therefore, high reliability regarding increase in load during the cooling/heating cycle is required.

Here, further stability during the cooling/heating cycle is also required of the solid electrolyte that is used in gas sensors and the like. That is, for example, stability in a higher temperature range that exceeds 1,000° C. is required. In a conventional solid electrolyte, there is room for improvement regarding stability.

Its thus desired to provide a solid electrolyte, a manufacturing method thereof, and a gas sensor that uses the solid electrolyte, in which the solid electrolyte is capable of preventing damage caused by, for example, a difference in coefficient of thermal expansion with a dissimilar material member, such as alumina or spinel.

An exemplary embodiment of the present disclosure provides a solid electrolyte that includes partially stabilized zirconia in which a stabilizer forms a solid solution in zirconia. The partially stabilized zirconia contains, as crystal particles that configure the partially stabilized zirconia, stabilizer low-concentration phase particles of which concentration of the stabilizer at a particle center is less than 4.7 mol % and stabilizer high-concentration phase particles of which the concentration of the stabilizer at the particle center is equal to or greater than 4.7 mol %. The partially stabilized zirconia includes an adjacent particle portion in which two or more particles of the stabilizer low-concentration phase particles of which an average particle size is greater than 0.1 μm are adjacent. An abundance ratio of the stabilizer high-concentration phase particles on a cross-section of the solid electrolyte is equal to or greater than 70% in terms of area ratio relative to all crystal particles.

Another exemplary embodiment of the present disclosure provides a gas sensor that includes the above-described solid electrolyte.

Still another exemplary embodiment of the present disclosure provides a manufacturing method of a solid electrolyte in which the manufacturing method includes: a mixing step of obtaining a mixture by mixing a first raw material powder that is made of zirconia particles, a second raw material powder that is made of aggregated particles in which a plurality of zirconia particles are aggregated, and a stabilizer raw material power; a molding step of obtaining a molded body by molding the mixture; and a sintering step of obtaining a solid electrolyte that is made of partially stabilized zirconia by sintering the molded body.

For example, in the solid electrolyte configured as described above, the coefficient of thermal expansion becomes closer to that of a dissimilar material member, such as alumina or spinel. Therefore, damage attributed to the difference in coefficient of thermal expansion between the solid electrolyte and the dissimilar material member can be prevented. For example, in the solid electrolyte, thermal stress with the dissimilar material member can be reduced even during a cooling/heating cycle in which the solid electrolyte is exposed to a high-temperature region that exceeds 1,000° C. Consequently, for example, when the solid electrolyte is used such as to be in contact with the dissimilar material member, peeling and cracking occurring in a contacting portion can be prevented.

For example, in the solid electrolyte that has the adjacent particle portion, the adjacent particle portion does not easily receive compressive stress from the high-concentration phase particles and the like in the periphery, during manufacturing by sintering and the like. A reason for this is thought to be that compressive stress is reduced at particle boundaries of the two or more particles of the low-concentration phase particles configuring the adjacent particle portion. As a result, in the adjacent particle portion, a thermally stable phase is easily formed during manufacturing. That is, it is thought that an unstable phase is reduced. As a result, it is thought that the coefficient of thermal expansion becomes closer to that of the dissimilar material member, as described above.

For example, the above-described gas sensor includes the solid electrolyte of which the difference in coefficient of thermal expansion with a dissimilar material member, such as alumina or spinel, is small, as described above. Therefore, internal damage does not easily occur in the gas sensor. The gas sensor exhibits high reliability that can withstand even a high-temperature environment exceeding 1,000° C.

The above-described solid electrolyte is obtained by the mixing step, the molding step, and the sintering step being performed. At the mixing step, the first raw material powder, the second raw material powder, and the stabilizer raw material powder are mixed. The second raw material powder is made of aggregated particles of zirconia particles. Such aggregated particles do not easily react with the stabilizer raw material powder at the sintering step. The stabilizer does not easily form a solid solution in the zirconia particles configuring the aggregated particles. As a result, the above-described stabilizer low-concentration phase particles are produced. In addition, the adjacent particle portion in which two or more particles of the stabilizer low-concentration particles are adjacent is formed. In this manner, the solid electrolyte of the configuration described above can be obtained.

At the sintering step, compressive stress is ordinarily applied to the zirconia particles. However, in the aggregated particles, a surface that does not receive compressive stress is present. As a result, at the sintering step, a more thermally stable phase can be easily formed during temperature decrease, for example. Consequently, in the solid electrolyte that is obtained by the above-described manufacturing method, it is thought that a thermally unstable phase is reduced.

As described above, according to the above-described exemplary embodiment s, a solid electrolyte that can prevent damage caused by a difference in coefficient of thermal expansion with a dissimilar material member, such as alumina or spinel, even when exposed to a high-temperature region that, for example, exceeds 1,000° C., a manufacturing method thereof, and a gas sensor that uses the solid electrolyte can be provided.

First Embodiment

A solid electrolyte according to an embodiment will be described with reference to FIG. 1 to FIG. 6. As shown in examples in FIG. 1 and FIG. 2 by (a) and (b), a solid electrolyte 1 is made of partially stabilized zirconia 2. The partially stabilized zirconia 2 is a so-called sintered body. The partially stabilized zirconia 2 is a sintered body in which a stabilizer forms a solid solution in zirconia.

As the stabilizer, yttria, calcia, magnesia, scandia, ytterbia, and the like are given as examples. The partially stabilized zirconia can contain at least one type of the foregoing as the stabilizer.

The partially stabilized zirconia 2 contains, as crystal particles 3 configuring the partially stabilized zirconia 2, stabilizer low-concentration phase particles 33 and stabilizer high-concentration phase particles 34. The stabilizer low-concentration phase particle 33 is referred to as a "low-concentration phase particle 33", as appropriate. The stabilizer high-concentration phase particle 34 is referred to as a "high-concentration phase particle 34", as appropriate.

The low-concentration phase particles 33 and the high-concentration phase particles 34 are the crystal particles 3 configuring the partially stabilized zirconia 2 that are classified based on a solid solution state of the stabilizer. That is, the low-concentration phase particles 33 and the high-concentration phase particles 34 are the crystal particles 3 seen from the perspective of the solid solution state of the stabilizer. The solid solution state can also be referred to as a solid-solution concentration state of the stabilizer.

The low-concentration phase particle 33 refers to the crystal particle 3 of which the concentration of the stabilizer, such as yttria, at a particle center O is less than 4.7 mol %. Measurement of the concentration of the stabilizer is performed by the concentration of metal elements, such as yttrium, in the stabilizer being measured by scanning electron microscope/energy-dispersive X-ray spectroscopy (that is, SEM/EDX analysis), described hereafter. A specific measurement method will be described hereafter in an experimental example.

Figure 3:
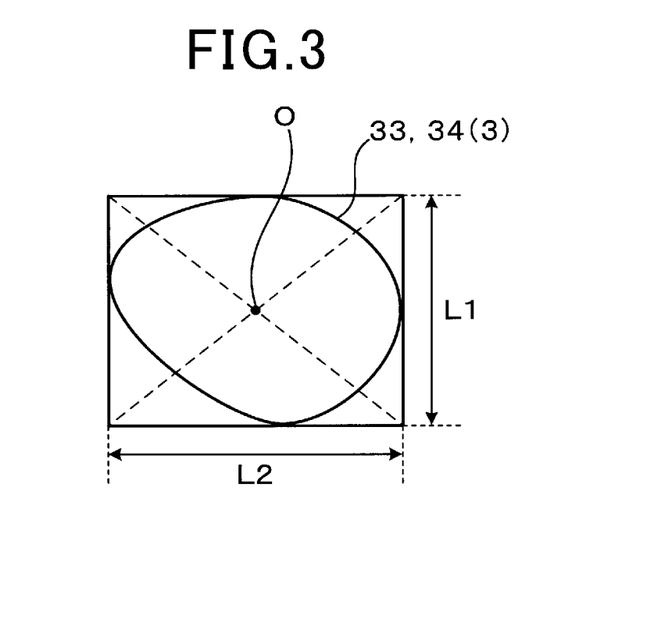
FIG. 3 is an explanatory diagram of a particle center and a particle size of a crystal particle according to the first embodiment.

As shown in an example in FIG. 3, the particle center of the crystal particle 3 refers to a center of gravity of a rectangle in which the crystal particle is surrounded by maximum widths of the particle in a horizontal direction and a vertical direction. This similarly applies not only to the low-concentration phase particle 33, but also to the high-concentration phase particle 34 as well.

The above-described high-concentration phase particle 34 refers to the crystal particle that does not correspond to the low-concentration phase particle 33. That is, the high-concentration phase particle 34 refers to the crystal particle of which the concentration of the stabilizer, such as yttria, at the particle center O is equal to or greater than 4.7 mol %.

In a production process for the partially stabilized zirconia 2, the stabilizer is considered to form a solid solution from the surface of a zirconia particle towards the center. It is thought that a concentration gradient in which the solid-solution concentration of the stabilizer decreases from the surface towards the center tends to be formed. Therefore, it is thought that, ordinarily, in the high-concentration phase particle 34 of which the concentration of the stabilizer at the particle center is equal to or greater than 4.7 mol %, the stabilizer sufficiently forms a solid solution throughout the overall crystal particle 3. A total amount of the high-concentration phase particles 34 and the low-concentration phase particles 33 is 100%.

The partially stabilized zirconia 2 includes an adjacent particle portion 35 in which two or more particles of the low-concentration phase particles 33 of which an average particle size is equal to or greater than 0.1 μm are adjacent. That is, it can be considered that, in a crystal structure of the solid solution state of the partially stabilized zirconia 2, the low-concentration phase particle 33 forms a primary particle and a connected particle portion in which a plurality of low-concentration phase particles 33 are adjacent forms a secondary particle.

When the average particle size of the low-concentration phase particles 33 that configure the adjacent particle portion 35 is less than 0.1 μm, advantages achieved by the connected particle portion being formed are lost. As a result, for example, a difference in coefficient of thermal expansion with a dissimilar material member may increase. From the perspective of further reducing the difference in coefficient of thermal expansion, the average particle size of the low-concentration phase particles 33 is preferably equal to or greater than 0.2 μm, more preferably equal to or greater than 0.25 μm, and even more preferably equal to or greater than 0.3 μm.

Meanwhile, from the perspective of further improving material strength, the average particle size of the low-concentration phase particles 33 that configure the adjacent particle portion 35 is preferably equal to or less than 1 μm, more preferably equal to or less than 0.5 μm, and even more preferably equal to or less than 0.4 μm.

As shown in the example in FIG. 3, the particle size of the low-concentration phase particle 33 is expressed by an arithmetical mean of a length L1 in the horizontal direction and a length L2 in the vertical direction of a rectangle in which the particle is surrounded by the maximum widths of the particle in the horizontal direction and the vertical direction. The average particle size of the low-concentration phase particles 33 is an arithmetical mean of the particle sizes of at least 30 low-concentration phase particles 33.

In the adjacent particle portion 35, two or more particles of the low-concentration phase particles 33 are adjacent. In the solid electrolyte that has such an adjacent particle portion 35 in the crystal structure, during sintering in the manufacturing of the solid electrolyte, for example, compressive stress from the high-concentration phase particle 34 that is made of cubic phase (C-phase) is not easily received.

A reason for this is that stress is reduced at a particle boundary of each low-concentration phase particle 33 configuring the adjacent particle portion 35. Therefore, transformation from tetragonal phase (T-phase) to monoclinic phase (M-phase) during a sintering temperature decrease process easily occurs. As a result, the thermodynamically unstable T-phase decreases, and the solid electrolyte becomes thermodynamically stable. As a result, the difference in coefficient of thermal expansion with the dissimilar material member, such as alumina and spinel, decreases.

From the perspective of further enhancing this effect, the partially stabilized zirconia 2 of the solid electrolyte preferably has the adjacent particle portion 35 in which three or more particles of the low-concentration phase particle 33 are adjacent, more preferably has the adjacent particle portion 35 in which five or more particles of the low-concentration phase particle 33 are adjacent, and even more preferably has the adjacent particle portion 35 in which ten or more particles of the low-concentration phase particle 33 are adjacent.

On a cross-section of the solid electrolyte, an abundance ratio of the adjacent particle portions 35 is preferably equal to or greater than 50% in terms of area ratio relative to the low-concentration phase particles 33. That is, the abundance ratio of the adjacent particle portions 35 relative to all low-concentration phase particles 33 is preferably equal to or greater than 50% in terms of area ratio. In this case, the above-described effect achieved by the adjacent particle portions 35 being formed is further enhanced. That is, the difference in coefficient of thermal expansion with the dissimilar material member, such as alumina and spinel, is further reduced.

Here, from the perspective of thermodynamics, the low-concentration phase particles 33 can be considered to be the M-phase. From the perspective of further reducing the difference in coefficient of thermal expansion, the abundance ratio of the adjacent particle portions 35 relative to all low-concentration phase particles 33 is more preferably equal to or greater than 70% and even more preferably equal to or greater than 80%.

Regarding calculation of the area ratio, an area of the low-concentration phase particles 33 is calculated from a product of a ratio of a circumference of a circle to its diameter it and particle size/2 squared. This similarly applies to the high-concentration phase particles 34 and the adjacent particle portions 35. That is, the areas of the low-concentration phase particle 33, the high-concentration phase particles 34, and the adjacent particle portions 35 are areas of circles that have radii that are half the length of respective particle sizes.

The abundance ratio of the adjacent particle portions 35 is preferably 8% to 16% in terms of area ratio relative to all crystal particles. Specifically, relative to a total of 100% of the high-concentration phase particles 34 and the low-concentration phase particles 33, the abundance ratio of the adjacent particle portions 35 is preferably 8% to 16% in terms of area ratio. In this case as well, the above-described effect achieved by the adjacent particle portions 35 being formed is further enhanced. That is, the difference in coefficient of thermal expansion with the dissimilar material member, such as alumina and spinel, is further reduced.

The average particle size of the adjacent particle portions 35 is preferably equal to or greater than 1 μm. In this case, the above-described effect of not easily receiving compressive stress during sintering in the manufacturing of the solid electrolyte becomes significant. Therefore, the unstable T-phase is further reduced, and the difference in coefficient of thermal expansion with the dissimilar material member is further reduced. From the perspective of further reducing the T-phase, the average particle size of the adjacent particle portions 35 is more preferably equal to or greater than 2 μm, and even more preferably equal to or greater than 3 μm.

In addition, the average particle size of the adjacent particle portions 35 is preferably equal to or less than 5 μm. In this case, generated stress during transition from the T-phase to the M-phase can be reduced. Therefore, the occurrence of cracking and the like is prevented, and strength of the solid electrolyte is improved. From the perspective of further improving strength, the average particle size of the adjacent particle portions 35 is more preferably equal to or less than 4 μm, and even more preferably equal to or less than 3.5 m.

Figure 4:
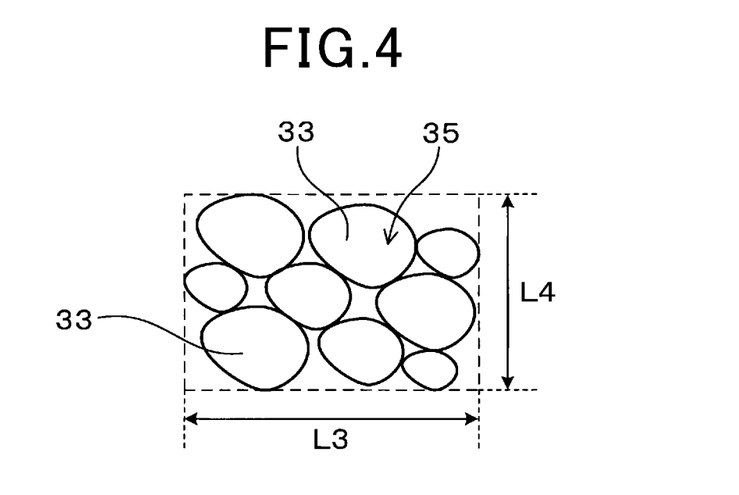
FIG. 4 is an explanatory diagram of a particle size of an adjacent particle portion according to the first embodiment.

As shown in an example in FIG. 4, the particle size of the adjacent particle portion 35 is expressed by an arithmetical mean of a length L3 in the horizontal direction and a length L4 in the vertical direction of a rectangle surrounded by the maximum widths of the particles in the horizontal direction and the vertical direction. The average particle size of the adjacent particle portions 35 is an arithmetical mean of the particle sizes of at least 30 adjacent particle portions 35.

In addition, the abundance ratio of the high-concentration phase particles 34 on the cross-section of the solid electrolyte 1 is equal to or greater than 70% in terms of area ratio relative to all crystal particles 3. The abundance ratio of the high-concentration phase particles 34 is an area ratio occupied by the high-concentration phase particles 34 relative to all crystal particles 3, that is, a sum of the low-concentration phase particles 33 and the high-concentration phase particles 34.

When the abundance ratio of the high-concentration phase particles 34 is less than 70%, the coefficient of thermal expansion of the solid electrolyte 1 decreases. As a result, for example, when the solid electrolyte 1 is used such as to be placed in contact with a dissimilar material member that is made of alumina, spinel ($MgAl_2O_4$), or the like of which the coefficient of thermal expansion is 7 to 10 ppm/° C., the difference in coefficient of thermal expansion between the solid electrolyte 1 and the dissimilar material member 4 increases.

Consequently, internal damage may occur inside an apparatus, such as a gas sensor, that uses the solid electrolyte 1. Specifically, peeling or cracking may occur between the solid electrolyte 1 and the dissimilar material member 4. From the perspective of further reducing the difference in coefficient of thermal expansion between the dissimilar material member 4, such as alumina or spinel, and the solid electrolyte 1, the abundance ratio of the high-concentration phase particle 34 is preferably equal to or greater than 75% and more preferably equal to or greater than 80%.

Meanwhile, based on common technical knowledge, the partially stabilized zirconia 2 can be considered to contain at least monoclinic phase particles 31 and cubic phase particles 32 as the crystal particles 3 that configure the partially stabilized zirconia 2, from the perspective of a crystal system.

In the description hereafter, the monoclinic phase is referred to as the "M-phase", as appropriate. The cubic phase is referred to as the "C-phase", as appropriate. In addition, the partially stabilized zirconia 2 may contain a tetragonal phase. The tetragonal phase is referred to as the "T-phase", as appropriate. The C-phase, M-phase, and T-phase are the crystal particles 3 configuring the partially stabilized zirconia 2 that are classified based on crystal phase structure. That is, the C-phase, M-phase, and T-phase are crystal particles seen from the perspective of the crystal system configuring the crystal phase. Although this is common technical knowledge, the C-phase, M-phase, and T-phase can be determined by X-ray diffraction analysis.

The high-concentration phase particle 34 can be considered to be made of the C-phase at room temperature, based on the crystal system. The low-concentration phase particle 33 can be considered to be made of the M-phase or the T-phase at room temperature, based on the crystal system. In the low-concentration phase particles 33, particles made of the M-phase and particles made of the T-phase may be present.

From the perspective of sufficiently achieving the above-described effect that is achieved by the adjacent particle portions 35 being formed, the low-concentration phase particles 33 are preferably made of the M-phase. The crystal particle that is made of the M-phase can be referred to as an M-phase particle. The coefficient of thermal expansion of the M-phase is 2 to 3 ppm/° C. The crystal particle that is made of the C-phase can be referred to as a C-phase particle. The coefficient of thermal expansion of the C-phase is 10 to 11 ppm/° C. The crystal particle that is made of the T-phase can be referred to as a T-phase particle. The coefficient of thermal expansion of the T-phase is 10 to 11 ppm/° C.

Figure 2:
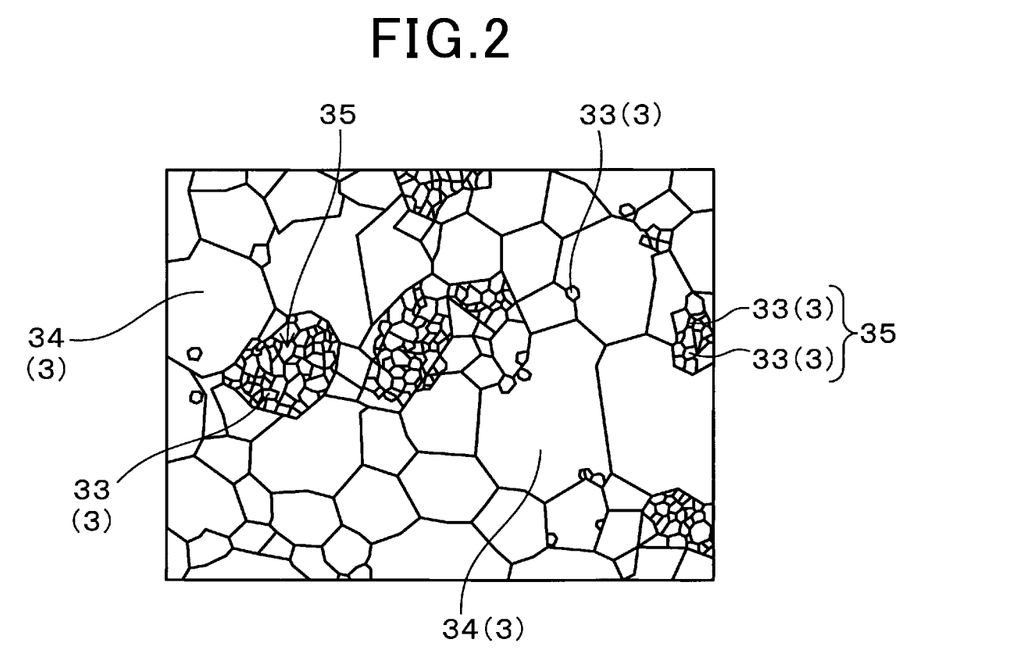
FIG. 2 is a schematic diagram of a microstructure of partially stabilized zirconia composing the solid electrolyte according to the first embodiment.

As shown in the example in FIG. 2 by (b), the low-concentration phase particles 33 and the adjacent particle portions 35 are formed on the particle boundaries of the high-concentration phase particles 34. For example, the average particle size of the low-concentration phase particles 33 is smaller than the average particle size of the high-concentration phase particles 34.

The average particle size of the high-concentration phase particles 34 is preferably equal to or greater than 1 μm. In this case, the compressive stress that is applied to the low-concentration phase particles 33 from the high-concentration phase particles 34 during sintering in the manufacturing of the solid electrolyte is reduced. As a result, the advantages achieved by the adjacent particle portions 35 being formed are not easily achieved.

From the perspective of sufficiently achieving the above-described effect that is achieved by the adjacent particle portions 35 being formed, the average particle size of the high-concentration phase particles 34 is more preferably equal to or greater than 2.5 μm, and even more preferably equal to or greater than 3 μm.

The average particle size of the high-concentration phase particles 34 is preferably equal to or less than 5 μm. In this case, the strength of the partially stabilized zirconia 2 itself that configures the solid electrolyte 1 can be prevented from decreasing. From the perspective of further improving strength, the average particle size of the high-concentration phase particles 34 is more preferably equal to or less than 4 μm, and even more preferably equal to or less than 3.5 μm.

The particle size of the high-concentration phase particle 34 is expressed by an arithmetical mean of the length L1 in the horizontal direction and the length L2 in the vertical direction of a rectangle surrounded by the maximum widths of the particle in the horizontal direction and the vertical direction. The average particle size of the high-concentration phase particles 34 is an arithmetical mean of the particle sizes of at least 30 high-concentration phase particles 34.

For example, the solid electrolyte 1 can be used such as to be placed in contact with the dissimilar material member that is made of alumina, spinel, or the like. For example, during the cooling/heating cycle in which the solid electrolyte that is configured as described above is exposed to a high-temperature region that exceeds 1,000° C., the coefficient of thermal expansion can be matched with that of the dissimilar material member up to the high-temperature region. Therefore, thermal shock breakage can be sufficiently prevented even in uses in which the solid electrolyte 1 is exposed to a high-temperature region.

From the perspective of achieving the effects of the present disclosure, the type of the stabilizer is not particularly limited. However, from the perspective of making chemical stability of the stabilizer favorable, the stabilizer is preferably made of yttria.

Figure 1:
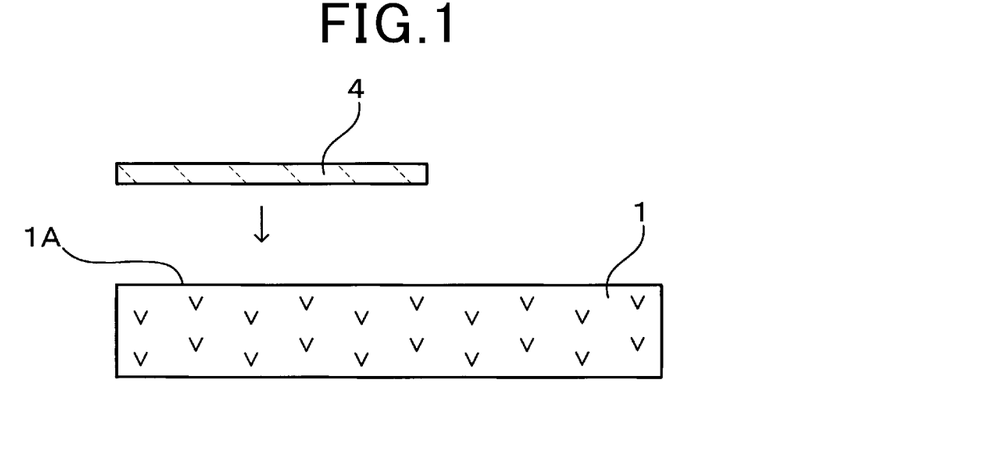
FIG. 1 is a schematic diagram of a cross-section of a solid electrolyte according to a first embodiment.

As shown in FIG. 1, the solid electrolyte preferably has a contacting portion that is configured to come into contact with the dissimilar material member. In this case, the effect of preventing peeling and cracks from occurring between the dissimilar material member and the solid electrolyte can be more precisely obtained, as a result of decrease in the difference in coefficient of thermal expansion between the solid electrolyte and the dissimilar material member. Here, the dissimilar material member is a member that is made of a material that differs from that of the solid electrolyte.

The contacting portion is merely required to be a portion that is at least partially in contact. For example, a contact surface is also included in the contacting portion. "The solid electrolyte has a contacting portion that is configured to come into contact with the dissimilar material member" means that the solid electrolyte is used such as to be in contact with the dissimilar material member, that is, has a constituent portion that is placed in contact with the dissimilar material member. Actual contact with the dissimilar material member is not necessarily required. For example, the solid electrolyte 1 can be used in a gas sensor. The solid electrolyte 1 such as this can include a gas contacting portion that is configured to come into contact with a measured gas, such as exhaust gas.

Next, a manufacturing method of the solid electrolyte will be described. As shown in examples in FIG. 5 and FIG. 6, the solid electrolyte is obtained by a mixing step S1, a molding step S2, and a sintering step S3 being performed.

Figure 5:
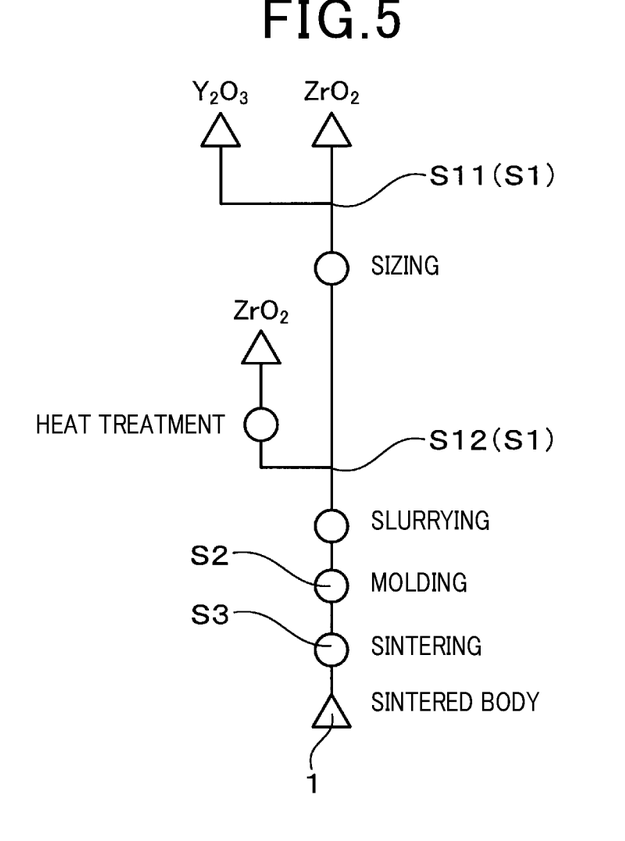
FIG. 5 is an explanatory diagram of a manufacturing method of the solid electrolyte according to the first embodiment.
Figure 6:
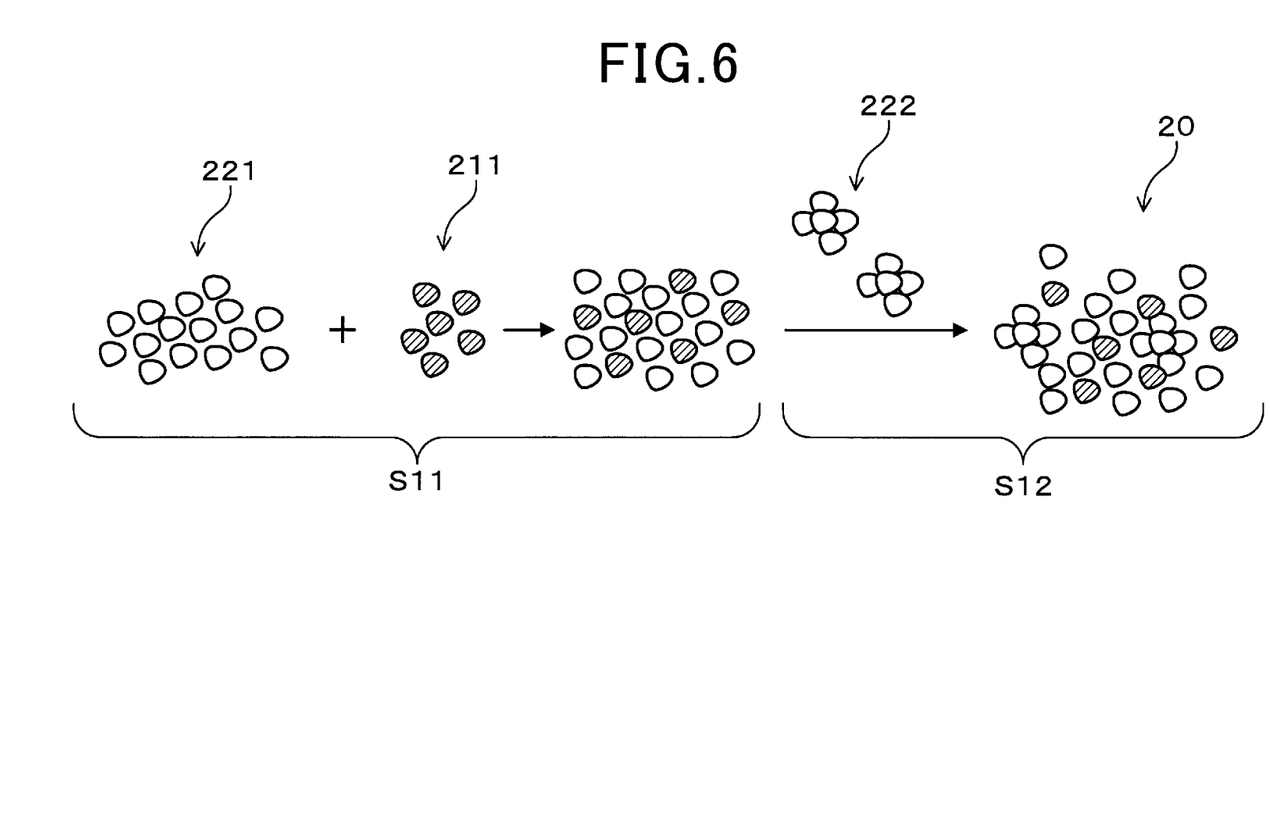
FIG. 6 is an explanatory diagram of a mixing step of raw materials according to the first embodiment.

At the mixing step S1, a first raw material powder 221, a second raw material powder 222, and a stabilizer raw material powder 211 are mixed. As a result, a mixture 20 is obtained. The first raw material powder 211 and the second raw material powder 222 are both made of zirconia. However, the second raw material powder 222 is made of aggregated particles in which a plurality of zirconia particles are aggregated. The stabilizer raw material powder 211 is made of a stabilizer, such as yttria. The second raw material powder 222 is a powder of which the average particle size is greater than that of the first raw material powder 221.

As the stabilizer raw material powder 211, yttria powder, calcia powder, magnesia powder, scandia powder, ytterbia powder, or the like can be used. As the stabilizer raw material powder 211, at least one type among the foregoing can be used.

The second raw material powder 222 can be fabricated by a raw material powder that is made of zirconia powder being subjected to heat treatment. The zirconia particles are aggregated together as a result of the heat treatment. Consequently, the second raw material powder 222 that is made of aggregated particles is obtained. The aggregated particles can be considered to be secondary particles that are formed by the zirconia particles (that is, primary particles) being aggregated.

The average particle sizes of the first raw material powder 221 and the second raw material powder 222 refer to the particle size at a volume integration of 50% in a particle-size distribution that is determined by a laser diffraction/scattering method. The particle size at a volume integration of 50% in the particle-size distribution that is determined by a laser diffraction/scattering method is referred to as "d50 particle size", as appropriate.

For example, the d50 particle size of the first raw material powder 221 can be within a range of 0.2 to 0.5 m. Meanwhile, for example, the d50 particle size of the second raw material powder 222 can be within a range of 1 to 5 m.

The mixing step S1 preferably further includes a first mixing step S11 and a second mixing step S12. At the first mixing step S11, the first raw material powder 221 and the stabilizer raw material powder 211 are mixed. At the second mixing step S12, after the first mixing step S11, the second raw material powder 222 is further mixed with the mixture of the first raw material powder 221 and the stabilizer raw material powder 211, and a mixture 20 is obtained.

The mixture 20 can be made into a slurry before molding. To make the mixture 20 into a slurry, a liquid such as water, alcohol, or a liquid organic substance can be used. A water-based liquid is preferably used. The mixture that is made into a slurry may be granulated.

Next, the molding step S2 is performed. At the molding step S2, the mixture 20 that contains the first raw material powder 221, the second raw material powder 222, and the stabilizer raw material powder 211 is molded. As a result, a molded body is obtained.

The molding method is not particularly limited. Compacting, pressure molding, extrusion molding, injection molding, hot press, cold isotropic pressure molding, grinding, and the like can be given. As a result of molding, a molded body of a desired shape based on intended use can be obtained. For example, molded bodies of various shapes such as a board shape, a sheet shape, a hollow sheet shape, a rod shape, a cylindrical shape, and a bottomed cylindrical shape can be obtained. Grinding can be performed on the molded body as required.

Next, at the sintering step S3, the molded body is sintered. As a result of the sintering, the partially stabilized zirconia 2 is produced and the solid electrolyte 1 is obtained. Sintering temperature can be changed as appropriate based on composition and the like, but is, for example, 1,300° C. to 1,500° C.

In the above-described manufacturing method, the second raw material powder 222 that is made of aggregated particles that do not easily react with the stabilizer is used as a portion of the zirconia raw material. As a result, the above-described low-concentration phase particles 33 are formed at the sintering step. In addition, the adjacent particle portions 35 are formed. In this manner, the solid electrolyte 1 according to the present embodiment can be obtained.

The solid electrolyte 1 according to the present embodiment is made of the partially stabilized zirconia 2 in which the stabilizer forms a solid solution in zirconia. The partially stabilized zirconia 2 includes the low-concentration phase particles 33 and the high-concentration phase particles 34 as the crystal particles 3 that configure the partially stabilized zirconia 2. The abundance ratio of the high-concentration phase particles 34 is equal to or greater than 70%.

In addition, the partially stabilized zirconia 2 has the adjacent particle portion 35 in which two or more particles of the low-concentration phase particles 33 of which the average particle size is equal to or greater than 0.1 μm are adjacent.

Because the solid electrolyte 1 is configured in this manner, for example, the coefficient of thermal expansion of the solid electrolyte 1 becomes closer to that of the dissimilar material member, such as alumina or spinel. Therefore, damage attributed to the difference in coefficient of thermal expansion between the solid electrolyte 1 and the dissimilar material member 4 can be prevented.

A reason for this is that, for example, in the solid electrolyte 1 that has the adjacent particle portions 35, the adjacent particle portion 35 does not easily receive compressive stress from the high-concentration phase particles 34 and the like in the periphery during manufacturing by sintering and the like. That is, a reason for this is thought to be that compressive stress is reduced at the particle boundaries of the two or more particles of low-concentration phase particles 33 configuring the adjacent particle portion 35.

As a result, it is thought that, in the adjacent particle portion 35, a thermally stable phase is easily formed during manufacturing and an unstable phase decreases. Here, the thermally stable phase is considered to be the M-phase, and the unstable phase is considered to be the T-phase. That is, it is thought that, in the adjacent particle portion 35, transition from the unstable T-phase to the stable M-phase easily occurs during sintering, and the T-phase decreases.

Therefore, for example, in the solid electrolyte 1, thermal stress with the dissimilar material member 4 can be reduced even during the cooling/heating cycle in which the solid electrolyte 1 is exposed to a high-temperature region that exceeds 1,000° C. Consequently, for example, when the solid electrolyte 1 is used such as to be in contact with the dissimilar material member 4, peeling and cracking can be prevented from occurring in the contacting portion.

Comparison Example 1

Next, a solid electrolyte of a comparison example will be described. A solid electrolyte 9 of a comparison example 1 is manufactured by a method that is similar to that according to the first embodiment, other than the second raw material powder not being used.

Specifically, the first raw material power 221 and the stabilizer raw material powder are mixed. Next, the mixture is made into a slurry, molded, and sintered. The solid electrolyte 9 of the present example can be obtained in this manner.

Figure 7:
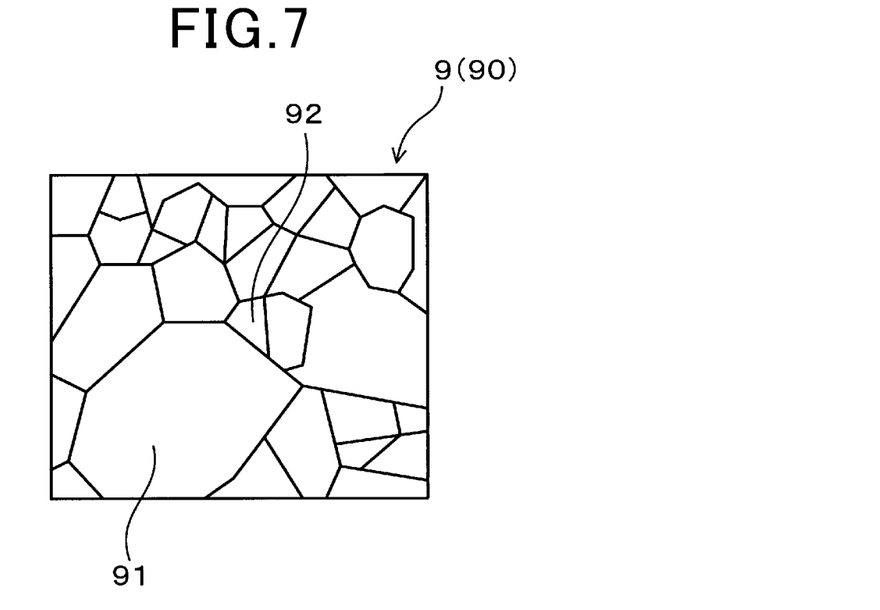
FIG. 7 is a schematic diagram of a microstructure of partially stabilized zirconia composing a solid electrolyte in a comparison example 1.

As shown in an example in FIG. 7, partially stabilized zirconia 90 that composes the solid electrolyte 9 of the present example contains C-phase particles 91 and M-phase particles 92 as the crystal particles 3.

In the present example, the second raw material powder that is made of aggregated particles is not used. Therefore, reactivity between the first raw material powder 221 and the stabilizer is high. As a result, although a solid solution state is omitted in the drawings, the stabilizer forms a solid solution into the interior of the M-phase particles 92 as well, in addition to the C-phase particles 91. This can be confirmed by SEM/EDX. The solid electrolyte 9 of the present example does not have an adjacent particle portion such as that according to the first embodiment. Consequently, the difference in coefficient of thermal expansion with the dissimilar material member increases.

Therefore, for example, during the cooling/heating cycle, the coefficient of thermal expansion of the solid electrolyte tends to significantly diverge from that of the dissimilar material member. As a result, for example, when the solid electrolyte is used such as to be in contact with the dissimilar material member that is made of alumina, spinel ($MgAl_2O_4$), or the like, the difference in coefficient of thermal expansion between the solid electrolyte and the dissimilar material member becomes large.

Peeling and cracking between the solid electrolyte and the dissimilar material member may occur. In particular, for example, during the cooling/heating cycle in which the solid electrolyte is exposed to a high-temperature region that exceeds 1,000° C., the divergence of the difference in coefficient of thermal expansion increases, and peeling and cracking more easily occurs.

Experimental Example 1

A plurality of solid electrolytes of an experimental example and a comparison example are fabricated, and performances thereof are compared and evaluated. A fabrication method of the solid electrolyte of the present example will be described below.

First, an yttria powder and a zirconia powder of which the d50 particle size is 0.30 μm were mixed and sized. In addition, as a result of the zirconia powder of which the d50 particle size is 0.30 μm being heat-treated at 1,100° C., the zirconia particles were aggregated together. As a result, a zirconia aggregated powder made of aggregated particles of the zirconia powder was obtained.

Next, the zirconia aggregated powder was mixed with the mixture of zirconia powder and yttria powder. The zirconia powder of which the d50 particle size is 0.30 μm corresponds to the first raw material powder, and the zirconia aggregated powder corresponds to the above-described second raw material powder. The yttria powder corresponds to the above-described stabilizer raw material powder. A mixing ratio thereof can be adjusted based on a target composition.

Next, the mixture of the zirconia powder, the yttria powder, and the zirconia aggregated powder and water were mixed, and a slurry of the mixture was obtained. To increase fluidity of the raw material particles that compose the mixture and facilitate molding into a desired shape, granulation of the slurry of the mixture was performed. For example, granulation is performed by spray granulation.

Next, the mixture was molded, and a molded body was obtained. For example, molding is performed by compacting. In the present example, the mixture was molded into a sample shape that is used in the evaluations described hereafter.

Next, the molded body was sintered at a temperature of 1,400° C. The solid electrolyte was obtained in this manner. In the present example, the solid electrolytes of samples 1 to 13, shown in Table 1, were fabricated by the average particle sizes of the raw materials, blending ratios, and the like being changed.

(Determination of Low-Concentration Phase Particles and High-Concentration Phase Particles, and Confirmation of Presence of Adjacent Particle Portions)

A measurement sample that has a width of 5 mm, a length of 20 mm, and a thickness of 2 mm was cut from each sample. After the surface of the measurement sample was ground, a thermal etching process was performed. Thermal etching was performed by the measurement sample being heated for 1 hour at a temperature of 1,200° C. Mapping of Y-elements was performed at five areas through composition analysis by SEM/EDX analysis. Regarding particles of which the Y-concentration is small among the observed particles, the Y-concentration at the particle center was measured.

As a result, the particles of which the Y-concentration at the particle center is less than 4.7 mol % were determined to be the low-concentration phase particles. Meanwhile, the particles of which the Y-concentration at the particle center is equal to or greater than 4.7 mol % were determined to be the high-concentration phase particles.

In addition, the presence of the adjacent particle portions in which a plurality of low-concentration phase particles are adjacent was confirmed through SEM/EDX analysis. For example, the low-concentration phase particles being adjacent can be confirmed by the presence of particle boundaries between the low-concentration phase particles. However, ordinarily, the low-concentration phase particles being adjacent can be easily confirmed through observation of an image that is acquired through SEM/EDX analysis.

Observation conditions for SEM are as follows: apparatus: "SU8220" manufactured by Hitachi High-Technologies Corporation; acceleration voltage: 5 kV; WD setting: 8.0 mm; current: 10 mA; magnification: 10,000 times. In addition, measurement conditions for EDX are as follows: apparatus: "XFlash 6160" manufactured by Bruker Corporation; acceleration voltage: 5 kV; WD setting: 14 mm; current: 5 to 15 mA; magnification: 50,000 times. The current was adjusted such that a detection amount is 40 to 55 kcps.

Next, a total of 30 low-concentration phase particles were selected from the above-described five areas, and the particle sizes thereof were measured by the above-described method. The average particle size of the low-concentration phase particles was determined by an arithmetical mean of the particle sizes of the low-concentration phase particles.

In addition, the particle sizes of all low-concentration phase particles present in isolation in the image of the above-described five areas acquired through SEM/EDX analysis and the particle sizes of all adjacent particle portions were each determined. Respective areas S of the low-concentration phase particles that are present in isolation and the adjacent particle portions are calculated from particle sizes r by expression (1), below. Next, an abundance ratio S3 (unit: %) of the adjacent particle portions relative to all low-concentration phase particles was calculated by expression (2), below, from a total S1 of the areas of the low-concentration phase particles present in isolation and a total S2 of the areas of the adjacent particle portions. Each area is an area of 12 m×9 m.

$$S = \pi r^2/4 \quad (1)$$

$$S3 = 100 \times S2/(S1+S2) \quad (2)$$

In addition, the abundance ratio of the adjacent particle portions relative to all crystal particles is calculated by the above-described total S2 of the areas of the adjacent particle portions being divided by an area of an observation area. The abundance ratio of the adjacent particle portions is expressed by an arithmetical mean of the abundance ratios of the five areas. The abundance ratio of the adjacent particle portions is expressed by percentage.

(Abundance Ratio of High-Concentration Phase Particles Relative to all Crystal Particles)

SEM/EDX analysis was performed in a manner similar to the method described above, aside from mapping of the Y-elements being performed at ten areas of the measurement sample. The particle sizes of all high-concentration phase particles included in the areas were measured and areas of the high-concentration phase particles were calculated by expression (1). The abundance ratio of the high-concentration phase particles in each area was calculated by a total of the areas of the high-concentration phase particles being divided by the area of the observation area. The abundance ratio of the high-concentration phase particles is expressed by an arithmetical mean of the abundance ratios of the ten areas. The abundance ratio of the high-concentration phase particles is expressed by percentage.

(Coefficient of Thermal Expansion)

A measurement sample that has a width of 5 mm, a length of 20 mm, and a thickness of 2 mm was cut from each sample. Thermal expansion behavior between room temperature and 1,050° C. was measured for the measurement samples. The room temperature is 25° C. A thermomechanical analyzer (that is, TMA) was used for measurement of the thermal expansion behavior. As the TMA, TMA 4000SA manufactured by Bruker AXS Corporation was used. An alumina sintered body was used in a reference sample used for measurement.

Here, measurement was performed five times for each sample. In addition, regarding the thermal expansion behavior, a slope from 500° C. to 600° C. was set as the coefficient of thermal expansion. Table 1 shows the average value of the measurements performed five times. A determination criterion is that, from the perspective of matching the coefficient of thermal expansion with that of the dissimilar material, the sample is determined to be "good" when the coefficient of thermal expansion is 8 to 9 ppm/° C., "excellent" when the coefficient of thermal expansion is 8.3 to 8.7 ppm/° C., and "not good" when the coefficient of thermal expansion is less than 8 ppm/° C. or greater than 9 ppm/° C.

TABLE 1

| Sample No. | Abundance ratio of high-concentration phase particles relative to all crystal particles (area ratio) | Presence of adjacent particle portions | Average particle size of low-concentration phase particles | Abundance ratio of adjacent particle portions relative to all low-concentration phase particles (area ratio) | Abundance ratio of adjacent particle portions relative to all crystal particles (area ratio) | Coefficient of thermal expansion ppm/° C. | Determination |
|---|---|---|---|---|---|---|---|
| 1 | 85% | None | 0.28 μm | | | 9.5 | Not good |
| 2 | 86% | Present | 0.25 μm | 42% | 79.5% | 8.9 | Good |
| 3 | 70% | Present | 0.26 μm | 55% | 16% | 8.2 | Good |
| 4 | 60% | Present | 0.26 μm | 80% | 30% | 7.5 | Not good |
| 5 | 86% | Present | 0.25 μm | 42% | 7% | 8.9 | Good |
| 6 | 84% | Present | 0.1 μm | 48% | 8% | 9 | Good |
| 7 | 84% | Present | 0.05 μm | 46% | 9% | 9.7 | Not good |
| 8 | 85% | Present | 0.31 μm | 50% | 8% | 8.7 | Excellent |
| 9 | 84% | Present | 0.32 μm | 81% | 13% | 8.5 | Excellent |

TABLE 1-continued

| Sample No. | Abundance ratio of high-concentration phase particles relative to all crystal particles (area ratio) | Presence of adjacent particle portions | Average particle size of low-concentration phase particles | Abundance ratio of adjacent particle portions relative to all low-concentration phase particles (area ratio) | Abundance ratio of adjacent particle portions relative to all crystal particles (area ratio) | Coefficient of thermal expansion ppm/° C. | Determination |
|---|---|---|---|---|---|---|---|
| 10 | 85% | Present | 0.35 μm | 80% | 7% | 9 | Good |
| 11 | 88% | Present | 0.26 μm | 78% | 10% | 8.7 | Excellent |
| 12 | 80% | Present | 0.31 μm | 83% | 16% | 8.3 | Excellent |
| 13 | 77% | Present | 0.32 μm | 77% | 18% | 8.1 | Good |

As is clear from Table 1, as in sample 2, sample 3, sample 5, sample 6, and sample 8 to sample 13, in the solid electrolyte of which the abundance ratio of the high-concentration phase particles relative to all crystal particles is equal to or greater than 70% and the adjacent particle portion in which two more particles of the low-concentration phase particles of which the average particle size is equal to or greater than 0.1 μm are adjacent is present, the coefficient of thermal expansion is 8 to 9 ppm/° C.

Therefore, regarding these solid electrolytes, the difference in coefficient of thermal expansion with a dissimilar material member that is made of alumina, spinel, or the like is small. Consequently, during the cooling/heating cycle, peeling and cracking can be prevented from occurring between the solid electrolyte and the dissimilar material member.

In addition, as is clear from Table 1, when the abundance ratio of the adjacent particle portions relative to the low-concentration phase particles on a cross-section of the solid electrolyte is equal to or greater than 50% in terms of area ratio, the difference in coefficient of thermal expansion with the dissimilar material member such as alumina or spinel is further reduced. Furthermore, the difference in coefficient of thermal expansion with the dissimilar material member is further reduced as a result of the abundance ratio of the adjacent particle portions relative to all crystal particles being set to 8 to 16% in terms of area ratio, as well.

Experimental Example 2

In a manner similar to that in the experimental example 1, a plurality of solid electrolytes are fabricated and performances thereof are compared and evaluated. In the present example, performance evaluation is performed from the perspective of strength, as well.

First, in a manner similar to that in the experimental example 1, the solid electrolytes of samples 14 to 21, shown in Table 2, were fabricated by the average particle sizes of the raw materials, blending ratios, and the like being changed. In addition to the measurements similar to those in the experimental example 1, the following measurements were also performed for each sample.

(Average Particle Size of Adjacent Particle Portions)

In a manner similar to that in the experimental example 1, the presence/absence of the adjacent particle portion was confirmed, and the particle size of the confirmed adjacent particle portion was measured by the above-described method. In addition, a total of 30 adjacent particle portions were selected from a plurality of areas, and the average particle size of the adjacent particle portions was determined by an arithmetical mean of the particle sizes of the adjacent particle portions.

(Average Particle Size of High-Concentration Phase Particles)

In a manner similar to the experimental example 1, determination of the high-concentration phase particle was performed, and the particle size of the confirmed high-concentration phase particle was measured by the above-described method. In addition, a total of 30 high-concentration phase particles were selected from a plurality of areas, and the average particle size of the high-concentration phase particles was determined by an arithmetical mean of the particle sizes of the high-concentration phase particles.

(Strength)

A measurement sample that has a width of 5 mm, a length of 45 mm, and a thickness of 5 mm was cut. A strength evaluation sample was fabricated from the measurement sample based on a four-point flexural strength test described in JIS R1601:2008. Next, the four-point flexural strength test based on JIS R1601:2008 was performed. The result thereof is the strength.

Here, the test was performed ten times for each sample. The table shows an average value of the tests. The strength was determined to be "good" at 250 MPa or greater, and "not good" at less than 250 MPa. When the strength is less than 250 MPa, for example, cracks may occur when the solid electrolyte is assembled to a sensor or the like. That is, from the perspective of ensuring strength in assembly inside an apparatus, the strength of the solid electrolyte is preferably equal to or greater than 250 MPa.

In addition, when the determination of either of the coefficient of thermal expansion and strength is "not good", the sample is evaluated as being "X". In addition, when the determination of neither of the coefficient of thermal expansion and strength is "not good", and the determination of even one is "excellent", the sample is evaluated as being "OO". Furthermore, when the determinations of both the coefficient of thermal expansion and strength are "good", the sample is evaluated as being "O". These are evaluations of suitability when the solid electrolyte is applied to a lamination-type gas sensor element. "OO" means that suitability is excellent, and "O" means that suitability is good. "X" means that suitability is not good.

TABLE 2

| Sample No. | Abundance ratio of high-concentration phase particles relative to all crystal particles (area ratio) | Presence of adjacent particle portions | Average particle size of low-concentration phase particles | Abundance ratio of adjacent particle portions relative to all low-concentration phase particles (area ratio) | Abundance ratio of adjacent particle portions relative to all crystal particles (area ratio) | Average particle size of adjacent particle portions |
|---|---|---|---|---|---|---|
| 14 | 85% | Present | 0.27 μm | 81% | 12% | 0.5 μm |
| 15 | 86% | Present | 0.31 μm | 80% | 12% | 1.0 μm |
| 16 | 84% | Present | 0.3 μm | 78% | 11% | 5.0 μm |
| 17 | 86% | Present | 0.28 μm | 75% | 12% | 8.2 μm |
| 18 | 83% | Present | 0.33 μm | 83% | 13% | 2.8 μm |
| 19 | 87% | Present | 0.32 μm | 75% | 11% | 3.5 μm |
| 20 | 86% | Present | 0.32 μm | 80% | 12% | 3.2 μm |
| 21 | 85% | Present | 0.28 μm | 86% | 12% | 3.1 μm |

| Sample No. | Average particle size of high-concentration phase particles | Coefficient of thermal expansion ppm/°C. | Strength | Evaluation |
|---|---|---|---|---|
| 14 | 3.0 μm | 8.8 (Good) | Good | ○ |
| 15 | 2.8 μm | 8.6 (Excellent) | Good | ○○ |
| 16 | 3.3 μm | 8.5 (Excellent) | Good | ○○ |
| 17 | 3.2 μm | 8.8 (Good) | Not good | X |
| 18 | 0.6 μm | 8.5 (Excellent) | Good | ○ |
| 19 | 1.0 μm | 8.5 (Excellent) | Good | ○○ |
| 20 | 5.0 μm | 8.5 (Excellent) | Good | ○○ |
| 21 | 8.2 μm | 8.5 (Excellent) | Not good | X |

As is clear from Table 2, in the solid electrolyte of which the abundance ratio of the high-concentration phase particles is equal to or greater than 70% and the adjacent particle portion in which two more particles of the low-concentration phase particles of which the average particle size is equal to or greater than 0.1 μm are adjacent is present, the coefficient of thermal expansion is 8 to 9 ppm/° C. Therefore, regarding these solid electrolytes, the difference in coefficient of thermal expansion with a dissimilar material member that is made of alumina, spinel, or the like is small. Consequently, during the cooling/heating cycle, peeling and cracking can be prevented from occurring between the solid electrolyte and the dissimilar material member.

In addition, when the average particle size of the adjacent particle portions is 1 to 5 μm, the difference in coefficient of thermal expansion with the dissimilar material is further reduced. Furthermore, the strength of the solid electrolyte is improved. Moreover, when the average particle size of the high-concentration phase particles is 1 to 5 μm as well, the difference in coefficient of thermal expansion with the dissimilar material is further reduced. Furthermore, the strength of the solid electrolyte is improved.

Second Embodiment

Next, an embodiment of a gas sensor 5 that uses a solid electrolyte will be described. Here, among reference numbers used according to the second and subsequent embodiments, reference numbers that are identical to those used according to a previous embodiment indicate constituent elements and the like that are similar to those according to the previous embodiment unless particularly stated otherwise.

Figure 8:
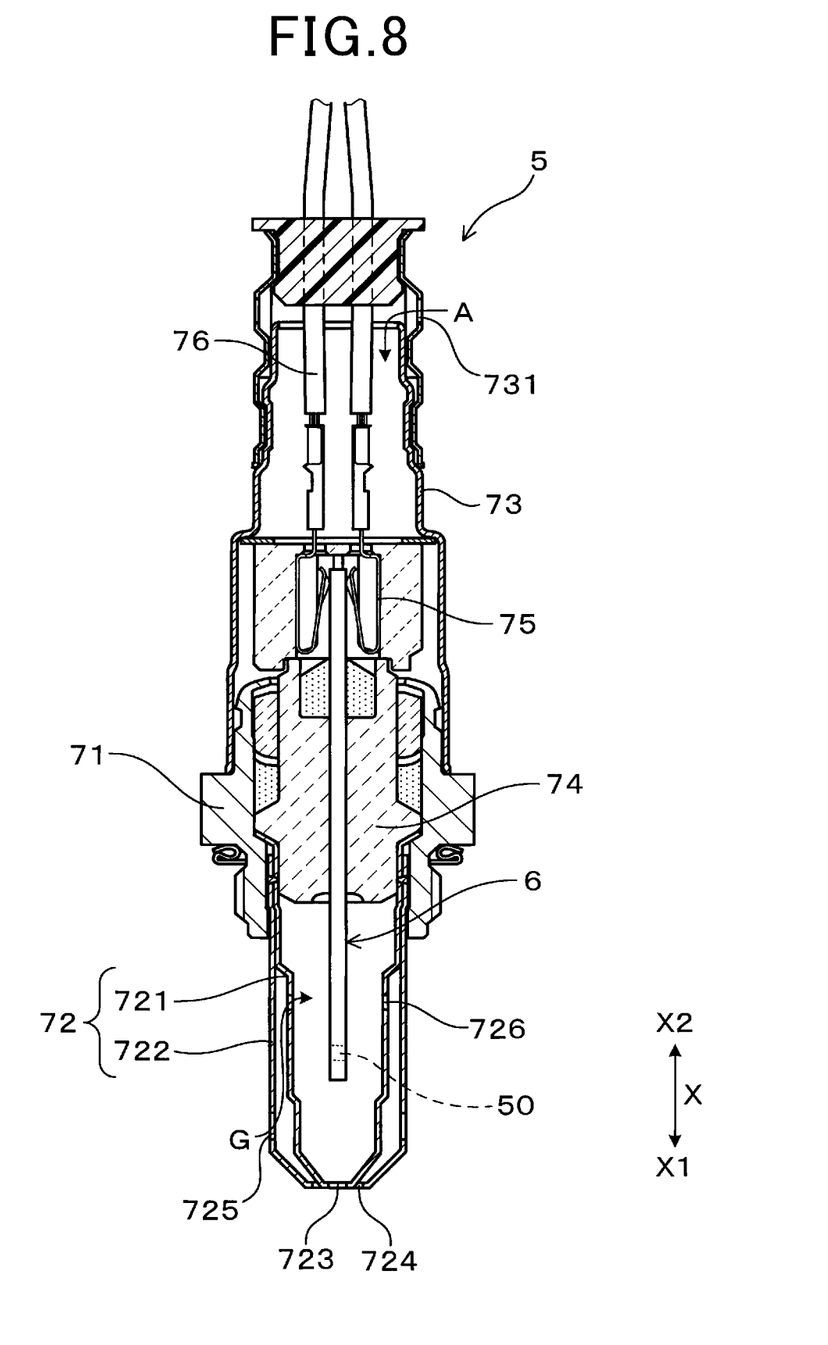
FIG. 8 is a cross-sectional view of a gas sensor according to a second embodiment.
Figure 9:
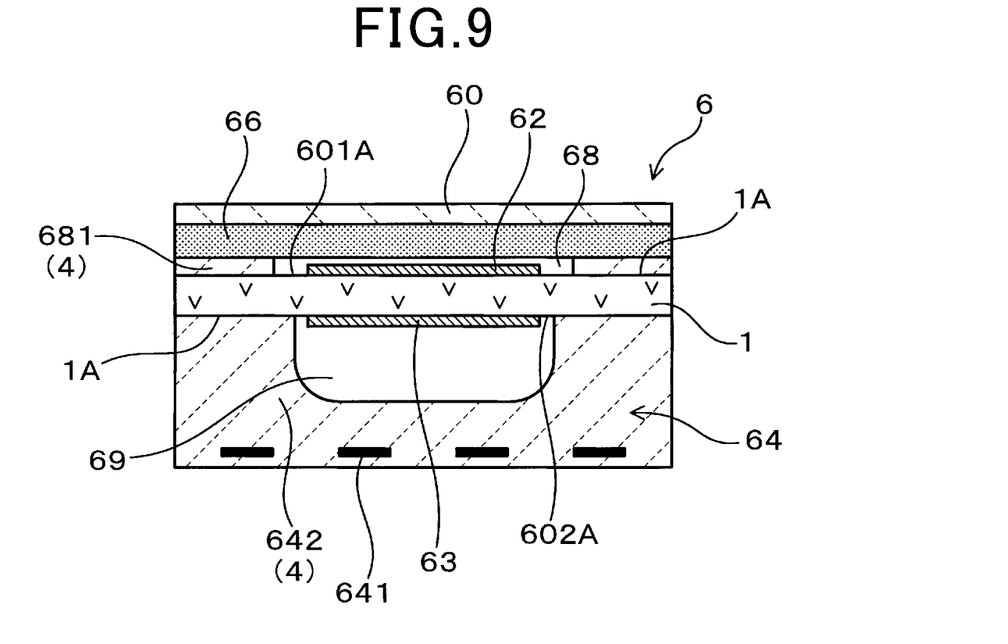
FIG. 9 is a cross-sectional view of a lamination-type gas sensor element according to the second embodiment.

As shown in FIG. 8 and FIG. 9, the gas sensor 5 according to the present embodiment includes a sensor element 6. The sensor element 6 according to the present embodiment is a gas sensor element that detects gas. The sensor element 6 includes the solid electrolyte 1, a detection electrode 62, a reference electrode 63, and a diffusion resistance layer 66. That is, the gas sensor 5 includes the solid electrolyte 1 inside the sensor element 6.

The detection electrode 62 and the reference electrode 63 are respectively formed on both surfaces 601A and 602A of the solid electrolyte 1. The detection electrode 62 and the reference electrode 63 form a pair of electrodes that are formed in positions that oppose each other. The diffusion resistance layer 66 restricts a flow amount of measured gas, such as exhaust gas G, that reaches the detection electrode 62. The gas sensor 5 is a limiting-current type that detects oxygen concentration (that is, air-fuel ratio) in the exhaust gas G based on a magnitude of a limiting current that is generated between the pair of electrodes 62 and 63 in a state in which a voltage is applied across the pair of electrodes 62 and 63.

The gas sensor 5 according to the present embodiment will be described in detail below. Here, in the description below, a side in an axial direction X of the gas sensor 5 that is exposed to the measured gas, such as the exhaust gas G, is referred to as a distal-end side X1, and a side opposite thereof is referred to as a base-end side X2.

(Gas Sensor)

The gas sensor 5 is used such as to be arranged in an exhaust pipe of an internal combustion engine of a vehicle or the like. As according to the present embodiment, the limiting-current-type gas sensor 5 is used as an air-fuel ratio sensor that quantitatively detects the air-fuel ratio of the exhaust gas G that flows through the exhaust pipe. The gas sensor 5 can quantitatively determine the air-fuel ratio both in a case in which the air-fuel ratio is on a rich side and a case in which the air-fuel ratio is on a lean side.

Here, the air-fuel ratio of the exhaust gas G refers to a mixture ratio of fuel and air during combustion in the internal combustion engine. In addition, the rich side refers to when the air-fuel ratio of the exhaust gas G is such that the fuel is on the greater side, compared to a theoretical air-fuel ratio when the fuel and the air completely combust. The lean side refers to the air-fuel ratio of the exhaust gas G being that in which the fuel is on the lesser side compared to the theoretical air-fuel ratio.

In the gas sensor 5 according to the present embodiment, as a result of the oxygen concentration in the exhaust gas being detected, the air-fuel ratio of the exhaust gas is detected. The gas sensor 5 that serves as the air-fuel ratio sensor essentially detects the oxygen concentration in the exhaust gas G on the lean side, and on the other hand, detects unburned gas concentration in the exhaust gas G on the rich side.

As shown in FIG. 8, the gas sensor 5 includes a housing 71, a distal-end-side cover 72, a proximal-end-side cover 73, and the like, in addition to the sensor element 6. The housing 71 is attached to the exhaust pipe and holds the sensor element 6 via an insulator 74. The distal-end-side cover 72 is attached to the distal-end side X1 of the housing 71 and covers the sensor element 6. The distal-end-side cover 72 has a double-layer structure and is made of an inner cover 721 and an outer cover 722. The proximal-end-side cover 73 is attached to the proximal-end side X2 of the housing 71 and covers a terminal 75 for electric wiring and the like of the sensor element 6.

(Sensor Element)

As shown in an example in FIG. 9, for example, a lamination-type sensor element is used as the sensor element 6. That is, the sensor element 6 can be configured by a lamination body in which the reference electrode 63, the plate-shaped solid electrolyte 1, and the detection electrode 62 are successively laminated.

As shown in the example in FIG. 9, for example, the sensor element 6 includes the plate-shaped solid electrolyte 1. The solid electrolyte 1 has a measured gas surface 601A and a reference gas surface 602A. The measured gas surface 601A is a surface that is exposed to the measured gas, such as the exhaust gas G. Meanwhile, the reference gas surface 602A is a surface that is exposed to reference gas, such as atmospheric air A. The measured gas surface 601A and the reference gas surface 602A are surfaces of the solid electrolyte 1 that are opposite each other.

The detection electrode 62 is provided on the measured gas surface 601A of the solid electrolyte 1. Meanwhile, the reference electrode 63 is provided on the reference gas surface 602A. When the sensor element 6 is configured by the lamination-type sensor element such as this, a heat generating member 641 that configures a heater 64 is laminated onto the solid electrolyte 1 via an insulator 642. For example, the insulator 642 is made of alumina.

The detection electrode 62 faces a measured gas chamber 68. The measured gas that has passed through the porous diffusion resistance layer 66 is introduced into the measured gas chamber 68. The measured gas chamber 68 is a space that is surrounded by the solid electrolyte 1, a measured gas chamber formation layer 681, and the diffusion resistance layer 66.

The detection electrode 62 is formed such as to be in contact with the solid electrolyte 1. Furthermore, the measured gas chamber formation layer 681 that is a structural component of the measured gas chamber 68 is formed such as to be in contact with the solid electrolyte 1. The detection electrode 62 is exposed to the measured gas, such as the exhaust gas G, and is a portion that performs gas detection together with the reference electrode 63. The detection electrode 62 is electrically connected to the terminal 75 to which a lead wire 76 is connected.

The reference electrode 63 faces a reference gas chamber 69. The reference gas, such as the atmospheric air A, is introduced into the reference gas chamber 69 from the proximal-end side X2 through a passage hole 731 in the proximal-end-side cover 73. Here, as the sensor element 6, a cup-type sensor element described hereafter can also be used instead of the lamination-type sensor element.

The detection electrode 62 is exposed to the measured gas, such as the exhaust gas G, that flows into the distal-end-side cover 42 through passage holes 723, 724, and 725 that are provided in the distal-end-side cover 72. The reference electrode 63 is exposed to the reference gas, such as the atmospheric air A, that flows through the passage hole 731 provided in the proximal-end-side cover 73 and into the reference gas chamber 69 of the solid electrolyte 1 from inside the proximal-end-side cover 73.

The heater 64 generates heat by energization. The heater 64 heats the solid electrolyte 1 and the electrodes 62 and 63 to an activation temperature during startup of the internal combustion engine and the gas sensor 5, or the like. The heater 64 is configured by the insulator 642 that is made of an alumina sintered body, and the heat generating body 641 that is formed inside the heater 64.

The alumina sintered body that composes the insulator 642 is in contact with the solid electrolyte. In other words, the sensor element 6 is a structural body in which the solid electrolyte 1 and the dissimilar material member 4 made of the alumina sintered body are in contact. The solid electrolyte 1 has a contacting portion 1A (specifically, a contacting surface) with the dissimilar material member 4 that is made of alumina. The insulator 642 that configures the heater is also a structural component forming the reference gas chamber 69 and also serves as a reference gas chamber formation layer.

In addition, in the solid electrolyte 1, the measured gas chamber formation layer 681 that configures the measured gas chamber 68 is laminated and formed on the measured gas surface 601A side. The measured gas chamber formation layer 681 is made of alumina. That is, the solid electrolyte 1 is in contact with the insulator 642 (that is, the dissimilar material member 4) that configures the heater 64, described above, on the reference gas surface 602A side, and is in contact with the measured gas chamber formation layer 681 (that is, the dissimilar material member 4) on the measured gas surface 601A side. The solid electrolyte 1 comes into contact with the measured gas at the measured gas surface 601A. The measured gas surface 601A can be considered to be the above-described gas contacting portion.

For example, the diffusion resistance layer 66 is made of a porous spinel body. In addition, a shielding layer 60 that is made of alumina is provided on a surface of the diffusion resistance layer 66. The shielding layer 60 is made of a dense body that does not transmit gas. The exhaust gas G that flows into the distal-end-side cover 72 passes through the diffusion resistance layer 66 and reaches a measuring portion 50 of the detection electrode 62. In the configuration of the sensor element 6 shown as an example in FIG. 9, the diffusion resistance layer 66 is not in contact with the solid electrolyte 1. However, a configuration in which the diffusion resistance layer 66 is in contact with the solid electrolyte 1 can also be used. In this case, the diffusion resistance layer 66 serves as the dissimilar material member 4.

(Solid Electrolyte)

The solid electrolyte 1 is made of partially stabilized zirconia 2. Specifically, the solid electrolyte described according to the first embodiment is used. The solid electrolyte 1 has a small difference in coefficient of thermal expansion with alumina and spinel. Thus, in the cooling/heating cycle, peeling and cracking between the heater 64 and the measured gas chamber formation layer 681, and the solid electrolyte 1 do not easily occur. In addition, even in a cooling/heating cycle in which, for example, the solid electrolyte 1 is exposed to a high-temperature region that exceeds 1,000° C., the difference in coefficient of thermal expansion in hysteresis is small and the difference in coefficient of thermal expansion with alumina and spinel in the high-temperature region is small.

Therefore, even when the solid electrolyte 1 is exposed to a high-temperature region, peeling and cracking between the solid electrolyte 1 and the dissimilar material member 4, such as the heater 64 and the measured gas chamber formation layer 681, do not easily occur. This means that, even when the gas sensor 5 is applied to use in which 1,000° C. is exceeded, the gas sensor 5 is capable of detecting measured gas while maintaining high reliability.

(Electrode)

The material of the detection electrode 62 according to the present embodiment is not particularly limited as long as the material has catalytic activity relative to oxygen and the like. For example, the detection electrode 62 can contain a composition of any of Pt (platinum), Au (gold), Ag (silver), a mixture or an alloy of Pd (palladium) and Ag, and a mixture or an alloy of Pt and Au, as a noble metal component. In addition, the material of the reference electrode 63 is also not particularly limited, and can contain Pt, Au, Ag, Pd, and the like as the noble metal component.

Figure 10:
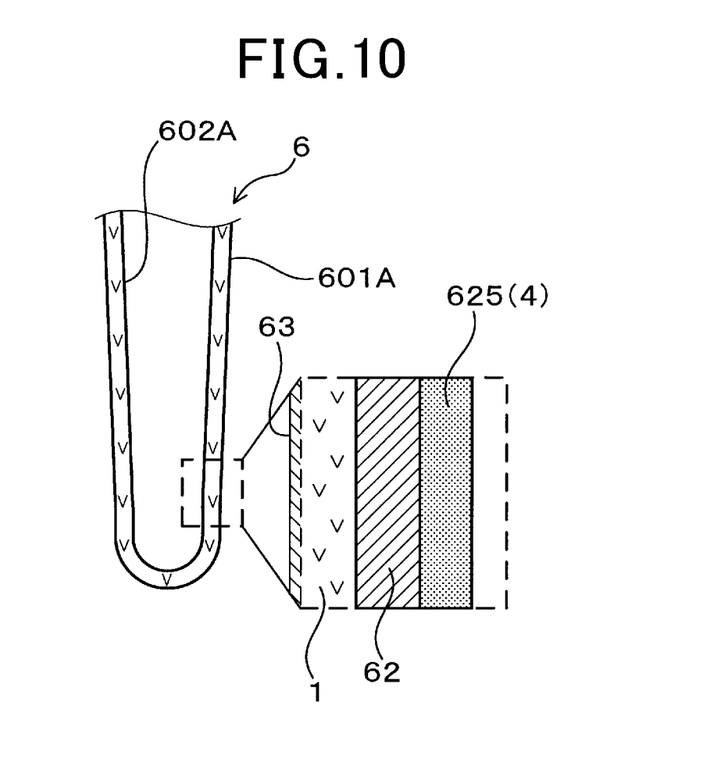
FIG. 10 is an explanatory diagram of a cross-section of a cup-type gas sensor element according to the second embodiment.

In addition, for example, as the sensor element 6, as shown in an example in FIG. 10, a bottomed-cylindrical-type (specifically, a cup-type) sensor element can also be used instead of the lamination-type sensor element. The cup-type sensor element such as this has bottomed, cylindrically shaped (specifically, cup-shaped) solid electrolyte 1, detection electrode 62, and reference electrode 63. The detection electrode 62 is provided on an outer peripheral surface 601A of the solid electrolyte 1. The reference electrode 63 is provided on an inner peripheral surface 602A of the solid electrolyte 1. In the cup-type sensor element such as this, a rod-shaped heater (not shown) is inserted inside the sensor element 6. The heater heats the sensor element 6 to a desired temperature.

The detection electrode 62 is provided on the outer peripheral surface 601A of the solid electrolyte 1. In addition, a porous protective layer 625 is formed on the outer peripheral surface 601A of the solid electrolyte. In FIG. 10, the protective layer 625 is a porous body and is, for example, made of spinel. In this case as well, in a manner similar to that in the above-described lamination-type sensor element, peeling and cracking do not easily occur between the solid electrolyte 1 and the dissimilar material member 4 such as the protective layer 625.

Therefore, even in the gas sensor 5 that includes the cup-type sensor element, the gas sensor 5 is capable of detecting measured gas while maintaining high reliability. Here, in the example in FIG. 10, the detection electrode 62 is present between the protective layer 625 and the solid electrolyte 1. However, the detection electrode 62 is not necessarily formed on the overall outer peripheral surface 601A. A non-formation portion is typically present. Therefore, although a configuration is omitted in the drawings, a portion in which the protective layer 625 and the solid electrolyte 1 are in contact is present.

In addition, the reference electrode 63 is provided on the inner peripheral surface of the cup-shaped solid electrolyte 1. However, the reference electrode 63 may be provided on the overall inner peripheral surface or may be partially provided. In cases in which the reference electrode 63 is partially provided, the alumina that configures the heater and the solid electrolyte may come into contact. In this case as well, because the solid electrolyte 1 is thermally stable, in a manner similar to that in the lamination-type sensor element, peeling and cracking between the solid electrolyte 1 and the dissimilar material member 4 such as the heater do not easily occur.

The present disclosure is not limited to the above-described embodiments. Various modifications are possible without departing from the spirit of the disclosure. That is, while the present disclosure has been described with reference to embodiments thereof, it is to be understood that the disclosure is not limited to the embodiments and constructions. The present disclosure covers various modification examples and modifications within the range of equivalency. In addition, various combinations and configurations, and further, other combinations and configurations including more, less, or only a single element thereof are also within the spirit and scope of the present disclosure.

For example, the solid electrolyte according to the first embodiment can also be used in a solid oxide fuel cell (SOFC). In this case, for example, the solid electrolyte has contact surfaces with an anode layer and a cathode layer. Although a configuration is omitted in the drawings, the solid electrolyte can be applied to a fuel cell unit cell in which the anode layer, an electrolyte layer made of the solid electrolyte, and the cathode layer are successively laminated. In addition, as a result of a plurality of fuel cell unit cells being laminated via a separator, a stack-type fuel cell can be constructed. Furthermore, as the gas sensor, there is an oxygen sensor, an NOx sensor, and the like in addition to the air-fuel ratio sensor. The solid electrolyte can also be applied to these sensors.

What is claimed is:

1. A solid electrolyte comprising:
   partially stabilized zirconia in which a stabilizer forms a solid solution in zirconia, wherein:
   the partially stabilized zirconia comprises, as crystal particles that configure the partially stabilized zirconia, stabilizer low-concentration phase particles of which concentration of the stabilizer at a particle center is less than 4.7 mol % and stabilizer high-concentration phase particles of which the concentration of the stabilizer at the particle center is equal to or greater than 4.7 mol %, and comprises an adjacent particle portion in which two or more particles of the stabilizer low-concentration phase particles of which an average particle size is greater than 0.1 μm are adjacent; and
   an abundance ratio of the stabilizer high-concentration phase particles on a cross-section of the solid electrolyte is equal to or greater than 70% in terms of area ratio relative to all crystal particles.

2. The solid electrolyte according to claim 1, wherein:
   the abundance ratio of the adjacent particle portions on a cross-section of the solid electrolyte is equal to or greater than 50% in terms of area ratio relative to the stabilizer low-concentration phase particles.

3. The solid electrolyte according to claim 2, wherein:
the abundance ratio of the adjacent particle portions on a cross-section of the solid electrolyte is 8 to 16% in terms of area ratio relative to all crystal particles.

4. The solid electrolyte according to claim 3, wherein:
an average particle size of the adjacent particle portions is 1 to 5 μm.

5. The solid electrolyte according to claim 4, wherein:
an average particle size of the stabilizer high-concentration phase particle is 1 to 5 μm.

6. The solid electrolyte according to claim 5, wherein:
the stabilizer comprises yttria.

7. The solid electrolyte according to claim 6, further comprising:
a contacting portion that is configured such that the solid electrolyte is in contact with a dissimilar material member.

8. The solid electrolyte according to claim 7, wherein:
the dissimilar material member comprises alumina or spinel.

9. The solid electrolyte according to claim 1, wherein:
the abundance ratio of the adjacent particle portions on a cross-section of the solid electrolyte is 8 to 16% in terms of area ratio relative to all crystal particles.

10. The solid electrolyte according to claim 1, wherein:
an average particle size of the adjacent particle portions is 1 to 5 μm.

11. The solid electrolyte according to claim 1, wherein:
an average particle size of the stabilizer high-concentration phase particle is 1 to 5 μm.

12. The solid electrolyte according to claim 1, wherein:
the stabilizer comprises yttria.

13. The solid electrolyte according to claim 1, further comprising:
a contacting portion that is configured such that the solid electrolyte is in contact with a dissimilar material member.

14. The solid electrolyte according to claim 13, wherein:
the dissimilar material member comprises alumina or spinel.

15. A gas sensor comprising:
a solid electrolyte according to claim 1.

* * * * *